Figure 1:
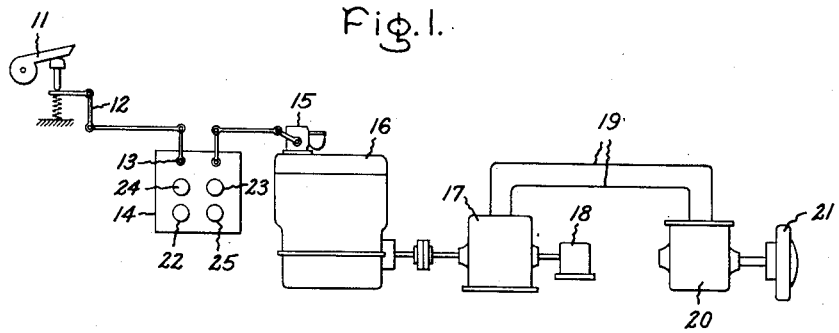

Nov. 29, 1949  M. A. EDWARDS ET AL  2,489,871
GOVERNOR FOR GAS ELECTRIC DRIVES
Filed Sept. 28, 1948  2 Sheets-Sheet 1

Inventors:
Martin A. Edwards,
Carl B. Lewis,
by Ravell & Mack
Their Attorney.

Nov. 29, 1949 M. A. EDWARDS ET AL 2,489,871
GOVERNOR FOR GAS ELECTRIC DRIVES
Filed Sept. 28, 1948 2 Sheets-Sheet 2

Inventors:
Martin A. Edwards,
Carl B. Lewis
by *Crowell & Mack*
Their Attorney.

Patented Nov. 29, 1949

2,489,871

UNITED STATES PATENT OFFICE 2,489,871

GOVERNOR FOR GAS ELECTRIC DRIVES

Martin Arthur Edwards, Scotia, N. Y., and Carl B. Lewis, North East, Pa., assignors to General Electric Company, a corporation of New York Application September 28, 1948, Serial No. 51,596

13 Claims. (Cl. 290—17)

1

Our invention relates to control for gas-electric vehicle drives and more particularly to a governor for an engine-generator unit whereby the governor is adapted to provide control of fuel input to the engine and also control of generator output.

Heretofore, it has been known to use an electro-hydraulic governor to control fuel input to a Diesel engine and, at the same time, automatically regulate the load by limiting field current of a generator driven by the engine. However, such schemes have been elaborate and expensive and better suited to use in costly Diesel-electric locomotives than in small vehicles, such as gas-electric pleasure cars, buses and industrial locomotives where the cost of the control becomes more important. Furthermore, the characteristics of a gasoline motor are different from those of a Diesel engine and the same type of control is not generally suitable for both. In addition, the ordinary motorist would not tolerate the unpleasant feeling that when he stepped on the accelerator his vehicle had a tendency to slow down until the speed change initiated a regulatory effect upon fuel input to the engine.

It is an object of the present invention to provide inexpensive means for overcoming some or all of the shortcomings of the prior art arrangements.

Another object of the present invention is to provide an electro-hydraulic governor capable of following large and rapid load changes.

It is a further object of the present invention to provide for a gas-electric vehicle a control system which will allow optimum vehicle performance without exceeding available engine power.

It is a still further object of the present invention to provide for a gas-electric engine generator a governor which will anticipate engine speed changes due to load changes and allow relatively more fuel to be admitted to the engine during periods of engine acceleration and thereby provide maximum utilization of engine capacity together with maximum fuel economy.

Broadly, the means employed in the embodiments herein illustrated and described comprises an electro-hydraulic governor having a fuel limit and speed-setting servomotor which operates responsive to accelerator pressure both to change the pivot point of the accelerator linkage and to recalibrate a speed-responsive solenoid which controls an additional servomotor which acts as a load control and speed-governing mechanism by adjusting rheostats in the generator field and

2 in the solenoid circuits and also adjusting the position of a butterfly valve in the engine carburetor. An important feature of the invention is referred to as a "superthrottle" principle which, for any accelerator pedal downward movement, allows the throttle to initially open wide and then close to some extent and which, for any accelerator pedal upward movement, allows the throttle to initially close and then open to some extent.

Figure 2:
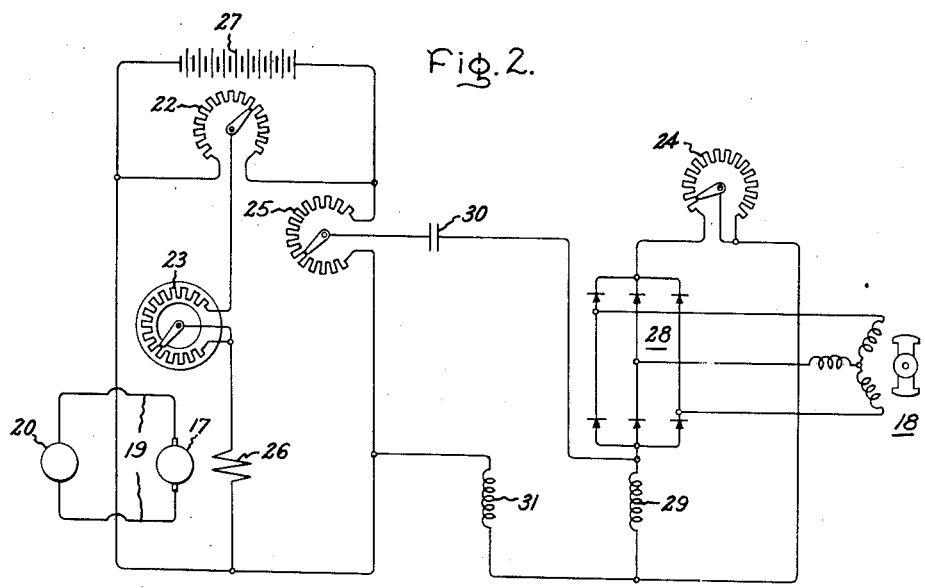
Figure 3:
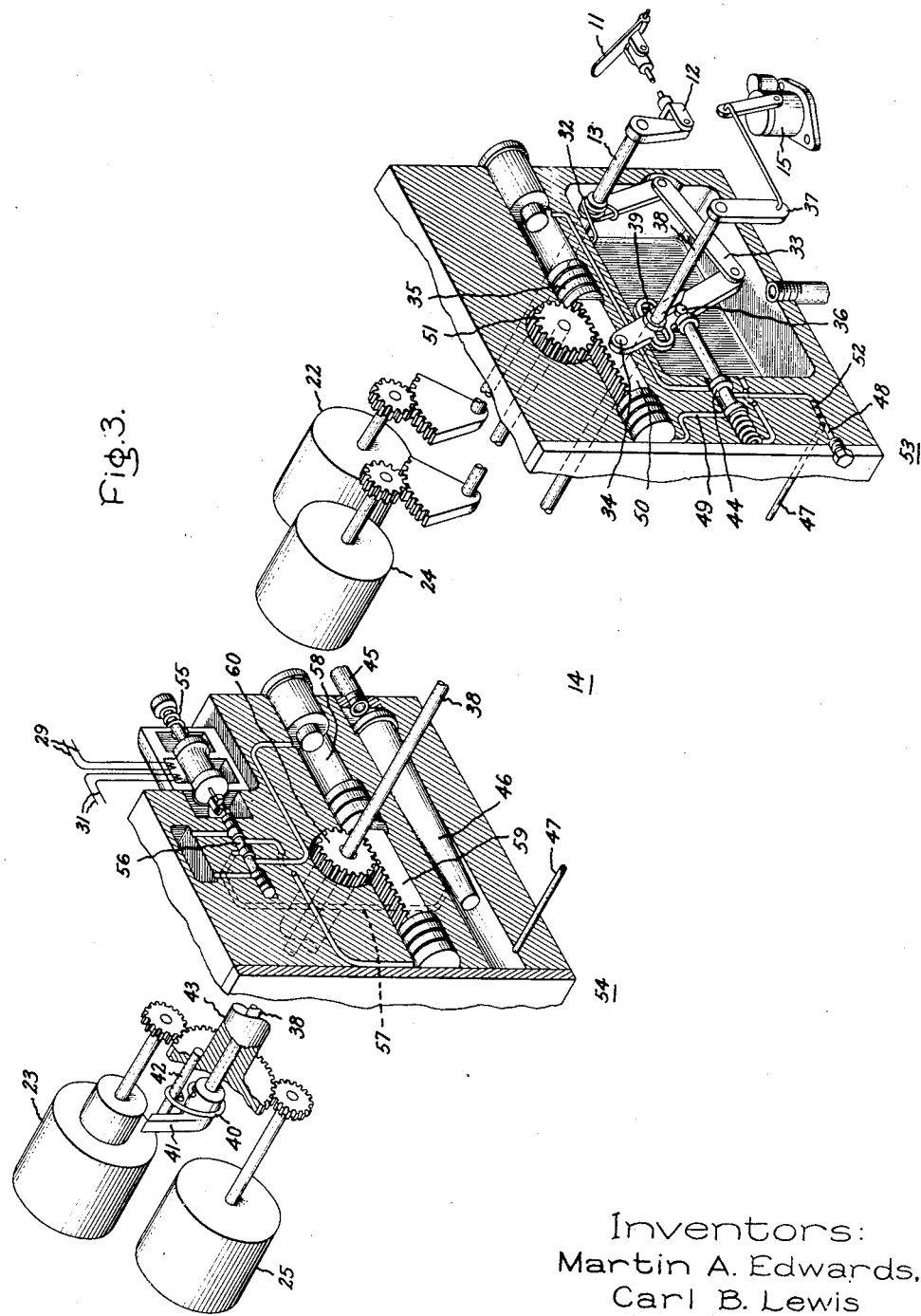

Other objects and advantages will become apparent and our invention will be better understood from consideration of the following description taken in connection with the accompanying drawing in which Fig. 1 is a diagrammatic illustration of a preferred embodiment of our invention applied to a driving wheel of a gas-electric vehicle; Fig. 2 is an elementary electrical circuit diagram of connections for the electric system of Fig. 1; and Fig. 3 is a functional mechanical diagram of the governor indicated in Figs. 1 and 2.

In Fig. 1 of the drawing, 11 represents a foot-operated accelerator pedal designed for manual control of the speed of a gas-electric vehicle. Accelerator pedal 11 operates a mechanical linkage 12 and an input shaft 13 of a governor device 14 to set a throttle to control the rate of fuel admission to the carburetor 15 of an internal combustion engine 16 which, for purposes of description, is assumed to be of the ignition (or conventional automobile) type. Engine 16 is mechanically coupled to drive an electric generator 17 as well as a tachometer generator 18. Through a loop circuit 19 the main generator is adapted to supply electric power to drive an electric motor 20 associated with wheel 21 of the vehicle. If desired, the single generator may supply more than one motor or a single motor may drive more than one wheel although for purposes of simplicity we have shown a single motor driving a single vehicle wheel.

The governor 14 is provided with four electrical rheostats 22, 23, 24 and 25. The governor input shaft 13 serves two functions: (1) to operate the rheostat 22 which may be identified as the low speed rheostat, and (2) to operate an internal linkage (hereinafter described in connection with Fig. 3) and thereby regulate the amount of fuel supplied to engine 16.

The first function mentioned above will be more clearly understood by reference to the elementary diagram of Fig. 2 in which it is seen that the generator 17 is adapted to supply current to the motor 20 through the loop circuit 19. The generator is provided with a field winding 26 which is connected in series with the voltage dividing arm of low speed rheostat 22 as well as in series with a load control rheostat 23, the operation of which is hereinafter explained. The field circuit (as well as other controls) may be conveniently energized from a battery 27 which may also be used for starting the engine by running the generator as a motor although the connections for this are not shown. With accelerator pedal 11 in the idling (or upward) position, the position of rheostat 22 is such as to insert resistance in the generator field circuit so that the vehicle may be operated at low speed although the engine is operating at a compartively high and efficient speed.

From reference to Fig. 2, it is seen that the tachometer 18 (adapted to be driven by engine 16) is a permanent magnet type A.-C. tachometer generator, the alternating output voltage of which is rectified by a three-phase full wave rectifier 28 so that the rectified voltage (when developed by the tachometer) produces a solenoid force proportional to engine speed and inversely proportional to circuit resistance. This force is utilized in the closed circuit comprising rectifier 28, rheostat 24 (which may be identified as the speed control rheostat) and a solenoid control coil 29. Rheostat 25 is a stabilizing rheostat which acts as a voltage divider and through a capacitor 30 will give a stabilizing signal to the solenoid which is also provided with a stabilizing coil 31.

Referring now to the functional diagram of the electro-hydraulic governor as shown in Fig. 3, it is seen again that operation of foot pedal 11 will operate linkage 12 and input shaft 13 which is biased in the "pedal up" position by a spring 32. Shaft 13 will first operate the low speed rheostat 22 as already explained. The second function of shaft 13 mentioned above, i. e., that of regulating the fuel supplied to the engine, is accomplished through the internal linkage 33, which is arranged to be rotatable with shaft 13 at one end and is secured at its other end to a pivot 34 which is movable to the right (or left) responsive to the motion of a slave piston 35. Linkage 33 carries a pin 36 which moves in one direction or the other responsive to movement of either slave piston 35 or input shaft 13 or both. The butterfly throttle valve (not shown) within the carburetor 15 is operated by an external linkage 37 responsive to rotation of the governor output shaft 38. Shaft 38 is provided with a cam finger 39 which is rotatable with the shaft and arranged adjacent pin 36 of linkage 33. The output shaft is spring-biased at its far end by a spring 40 operating in conjunction with a cam finger 41 for spring-loading the shaft with respect to a pin 42 associated with a separately rotatable sleeve 43. Thus, the output shaft 38 is spring-loaded with respect to sleeve 43 and will follow initial movement of pin 36 to first control the position of the carburetor valve. Later on, after sufficient movement of accelerator pedal 11, pin 36 of linkage 33 will operate a servo valve 44 (which is normally spring-biased to the right). Oil is supplied under pressure to the governor at the conduit 45. The oil supply may conveniently be obtained from the engine lubricating system (not shown). Oil from conduit 45 passes through a filter 46 and into conduit 47 and conduit 48 to the valve 44 so that operation of this valve to the left will admit oil through a conduit 49 to the left end of the cylinder housing piston 35.

This will move piston 35 to the right and re-align the pivot 34 so that for the given accelerator pedal position the butterfly valve position will be changed to increase the supply of fuel to the engine. This is the super throttle feature previously referred to. At the same time, movement of piston 35 and its rack 50 will operate a pinion 51 to change the setting of the speed control rheostat 24. The delayed action of valve piston 44 may be enhanced by the insertion of a porous plug 52 in the oil line 48. Such a porous plug can be readily designed of a consistency, cross section and length sufficient to act as an orifice to provide the proper restriction of flow of oil to this valve.

Thus, it is apparent that the half of the governor which in Fig. 3 is represented as the front half, and generally designated as 53, operates as a fuel limit and speed-setting servomotor.

The other half of the governor, which in Fig. 3 is represented as 54 and as the back half, operates as a load control and speed governing servomechanism. As indicated in Fig. 3, the solenoid force produced by solenoid control coil 29 (or solenoid stabilizing coil 31) is compared with the reference force produced by a manually adjustable spring 55 and when the two forces are equal a pilot valve 56 is in its mid position shown. Any load change will cause an engine speed change and unless such a change is compensated for by a change in the position of the speed control rheostat 24, there will be a change in solenoid force so that oil which is pumped into the governor through conduit 45 and filter 46 to conduit 57 and pilot valve 56 will be introduced to one end or the other of a slave cylinder 58 to cause operation of piston rack 59 and pinion 60 (formed integral with sleeve 43) to adjust load control rheostat 23 and stabilizing rheostat 25.

Thus, a load change causing a speed change will move pilot valve 56 (responsive to the solenoid force produced by the rectified output of the tachometer generator) causing the slave cylinder to act on both carburetor setting (through sleeve 43 and then through output shaft 38) and generator excitation (through load control rheostat 23) as well as giving a signal (through voltage dividing rheostat 25) to re-stabilize the system to balance at the new condition.

Movement of stabilizing rheostat 25 will cause an initial impulse to be given to the solenoid coils which (because of the capacitor) will then be compensated with respect to rate of change of speed and with respect to rate of change of slave piston movement in cylinder 58.

The output of the generator will always be limited to exactly the same amount as engine ability (less losses), but the load control rheostat 23 (which is adapted to increase the generator field circuit resistance and thereby limit generator output) serves to match the demand which the generator makes upon the engine with the then existing ability of the engine to assure that there will be no possibility of stalling due to exceeding available engine power.

With a control of this type, the prime mover will operate at full torque over the entire speed range. Under all conditions where the vehicle can use the torque available from the engine, the speed of the power plant is maintained by automatic variation of the load control rheostat 23. If the torque required is less than the torque available the governor will reduce the fuel to the engine since the speed governing feature provided by tachometer 18 and speed control rheostat 24 and the associated solenoid controlled servomechanism 54 will operate through sleeve 43 and output shaft 38 to limit the fuel supply whenever this is desirable to assure maximum fuel economy.

In order for the power plant to be able to accelerate to an increased speed setting (without first decreasing the load upon the engine), it is necessary with a control of the type described to transiently allow more than normal fuel to be used by the engine and this feature is provided by the "superthrottle" arrangement already mentioned.

There is thus provided a device of the character described which is capable of meeting the objects hereinabove set forth. It will be seen from the above description and the drawings that the governor input shaft is able to control the position of the butterfly valve in the carburetor substantially directly and, in addition, the governor input shaft will operate a low speed rheostat to allow low speed operation of the vehicle without danger of engine stalling. Upon any sudden depression of the accelerator pedal, the internal linkage in the governor is such as to provide a super throttle feature by causing operation of the fuel limit servomechanism so that the initial fuel input will be greater than the "steady state" input for the particular accelerator position. This is so because a predetermined time delay is provided which allows the engine to accelerate without any necessity of first reducing load. This eliminates any possibility of the operator having the unpleasant feeling that when he stepped on the accelerator the car had the tendency to lose power momentarily. This feature provides an additional advantage in that it allows overloading the system in case of an emergency since a continuous "superthrottle" position will allow a greater than maximum fuel supply and increased horsepower output of the power plant. Continuous "superthrottle" (as distinguished from the initial or transient function) is achieved by depressing the foot pedal to its maximum travel.

The electro-hydraulic governor control system described combines an engine governor with a generator field regulator in such a way as to automatically reduce generator output when the governor demands more fuel due to maximum engine load being reached. The governor limits fuel as a function of engine speed to provide maximum operating economy at the same time that it controls the load to match generator demand with engine ability.

Any tendency to "hunt" is eliminated by the stabilizing voltage dividing rheostat 25 which is responsive to slave cylinder 58 operation responsive to change of fuel feed so that this rheostat will cause transient flow of current through the capacitor and stabilizing coil. In addition, stabilizing with respect to rate of change of speed is provided since current may transiently flow from the tachometer through the capacitor to the solenoid stabilizing coil.

While we have illustrated and described particular embodiments of our invention, we desire it to be understood that our invention is not to be limited to the particular arrangements disclosed, and we intend in the appended claims to cover all modifications which do not depart from the spirit and scope of our invention.

What we claim as new and desire to secure by Letters Patent of the United States is:

1. In a power system for a gas-electric vehicle having a gas engine and an electric generator adapted to be driven by said engine, a throttle valve for said engine, a manually operated accelerator, a governor for said engine and said generator, a spring-loaded governor output shaft adapted to operate said throttle valve, a linkage from said accelerator adapted to stop movement of said spring-loaded shaft, a fluid pressure motor adapted to further stop movement of said spring-loaded shaft at any predetermined accelerator position, a second fluid pressure motor adapted to change the spring loading on said output shaft to still further regulate said throttle valve position, means responsive to accelerator position for actuating said first fluid pressure motor, and means responsive to a predetermined speed of operation of said engine for actuating said fluid pressure motor.

2. In a power system for a gas-electric vehicle having a gas engine and an electric generator adapted to be driven by said engine, a throttle valve for said engine, a manually operated accelerator, a governor for said engine and said generator, a spring-loaded governor output shaft adapted to operate said throttle valve, a linkage from said accelerator adapted to stop movement of said spring-loaded shaft, a fluid pressure motor adapted to further stop movement of said spring-loaded shaft at any predetermined accelerator position after a predetermined time delay, a second fluid pressure motor adapted to change the spring loading on said output shaft to still further regulate said throttle valve position, means responsive to accelerator position for actuating said first fluid pressure motor, and means responsive to a predetermined speed of operation of said engine for actuating said second fluid pressure motor.

3. A hydro-electric governor for the combination of a gas engine and an electric generator driven by said engine, said governor having a fuel limit and speed setting servomechanism, an accelerator pedal, a throttle valve for said engine, means for initially positioning said throttle valve responsive to movement of said accelerator pedal, means for thereafter changing said throttle position to cut down the amount of fuel supplied to the engine at the given accelerator position through operation of said servomechanism actuated by said accelerator movement after a predetermined time delay, a tachometer generator driven by said engine, a load control and speed governing servomechanism in said governor actuated by a solenoid, means for energizing said solenoid from the output of said tachometer generator, a rheostat operable responsive to movement of said first servomechanism and connected in the circuit from said tachometer output to said solenoid, means for repositioning throttle valve position in response to operation of said second servomechanism, means for exciting the field of said generator, and means including a rheostat adapted to be operated by said second servomechanism and connected in the circuit of said generator field exciting means for adjusting the load on said engine.

4. A gas engine, an electric generator adapted to be driven by said engine, a field winding for said generator, an accelerator lever, a governor mechanism for said engine generator combination, an input shaft on said governor operable by said accelerator lever, a fuel limit and speed setting servomotor in said governor and arranged to be responsive to accelerator lever movement, pivoted linkage means associated with said input shaft and adapted to vary the amount of fuel supplied to said engine, means for changing the pivot point of said linkage responsive to operation of said fuel limit and speed setting servomotor, a load control and speed governing servomotor in said governor and arranged to be responsive to speed of operation of said engine determined by positioning of said first servomotor and also arranged to be responsive to rate of change of speed of said engine and to rate of change of said second servomotor positioning, means for exciting said generator field winding, means for varying said generator field excitation responsive to movement of said second servomotor, and means for varying the amount of fuel supplied to said engine responsive to movement of said second-mentioned servomotor.

5. A gas engine, an electric generator adapted to be driven by said engine, a field winding for said generator, an accelerator lever, a governor mechanism for said engine generator combination, an input shaft on said governor operable by said accelerator lever, a fuel limit and speed setting servomechanism in said governor arranged to be responsive to accelerator lever movement, pivoted linkage means for said input shaft adapted to vary the amount of fuel supplied to said engine, means for changing the pivot point of said linkage responsive to operation of said fuel limit and speed setting servomechanism, a load control and speed governing servomechanism in said governor arranged to be responsive to speed of operation of said engine determined by positioning of said first servomechanism and also arranged to be responsive to rate of change of speed of said engine and to rate of change of said second servomechanism position, means for exciting said generator field winding, means for varying said generator field excitation responsive to movement of said second servomechanism, means for varying the amount of fuel supplied to said engine responsive to movement of said second-mentioned servomechanism, and means for changing said generator field excitation responsive to initial movement of said accelerator lever.

6. A gas engine, an electric generator adapted to be driven by said engine, a governor for said engine, a throttle valve for said engine, an input shaft for said governor, an output shaft for said governor, a field exciting winding for said generator, accelerating means adapted to cause movement of said governor input shaft, means including a linkage from said input shaft to regulate the position of said throttle valve, and means including a rheostat operable from said input shaft to vary the excitation of said generator field with initial movement of said input shaft from the idling position.

7. A governor for an engine generator provided with an accelerator, said governor having a fuel limit and speed setting servomechanism and a load control and speed governing servomechanism, means for causing said first-mentioned servomechanism to be operable responsive to positioning of said accelerator, means including a solenoid for causing said second-mentioned servomechanism to be operated responsive to a predetermined speed and rate of change of speed of operation of said engine generator, a throttle valve adapted to adjust the amount of fuel admitted to the engine, a spring-load governor output shaft adapted to position said throttle valve, means whereby the spring loading and stop position of said output shaft are adapted to be regulated by said second-mentioned servomechanism, means whereby said output shaft is adapted to follow movement of said first-mentioned servomechanism, means for exciting the field of said generator, means including a load control rheostat adapted to be operated by said second-mentioned servo-mechanism for varying said generator field excitation, stabilizing means including a rheostat adapted to be operated by said second-mentioned servomechanism and connected to transiently energize said solenoid for stabilizing the operation of said servomechanism, and means including a rheostat operable by said first-mentioned servomechanism and connected in the circuit of said solenoid for speed setting of said governor.

8. A governor for an engine generator provided with an accelerator, said governor having a fuel limit and speed setting servomechanism and a load control and speed governing servomechanism, means for causing said first-mentioned servomechanism to be operable responsive to positioning of said accelerator, means for delaying the response of said first-mentioned servomechanism with change of said accelerator position in one direction, means including a solenoid for causing said second-mentioned servomechanism to be operated responsive to a predetermined speed of operation of said engine generator, a throttle valve adapted to adjust the amount of fuel admitted to the engine, a spring-loaded governor output shaft adapted to position said throttle valve, means whereby the spring loading of said output shaft is adapted to be regulated by said second-mentioned servomechanism, means whereby said output shaft is adapted to follow movement of said first-mentioned servomechanism, means for exciting the field of said generator, means including a low speed rheostat operable by said accelerator for varying said generator field excitation, means including a load control rheostat adapted to be operated by said second-mentioned servomechanism for varying said generator field excitation, stabilizing means including a rheostat adapted to be operated by said second-mentioned servomechanism and connected to transiently energize said solenoid for stabilizing the operation of said servomechanism, and means including a rheostat operable by said first-mentioned servomechanism and connected in the circuit of said solenoid for speed setting of said governor.

9. A gas electric vehicle having a gas engine and a direct current generator, an accelerator pedal for said vehicle, a governor for said engine and generator, means associated with said governor and adapted to be operable responsive to initial downward accelerator pedal movement for varying the field excitation of said generator, means associated with said governor and adapted to be operable responsive to any accelerator pedal movement for controlling the admission of fuel to said engine, additional means for governing the speed of said engine, and means associated with said governor and adapted to be operable responsive to accelerator pedal movement for recalibrating said speed governing means.

10. A power system for a gas-electric vehicle including a gas engine, a direct current generator adapted to be driven by said engine, at least one motor adapted to be powered by said generator and to drive said vehicle, a tachometer generator adapted to be driven by said engine, a solenoid control coil adapted to be energized by said tachometer, a rheostat in the circuit of said tachometer and said solenoid control coil for controlling the speed at which said solenoid control coil will be responsive, means including a servomechanism for positioning said rheostat, a second servomechanism arranged to be operable in response to energization of said solenoid control coil, and means for stabilizing the action of said second-mentioned servomechanism, said last mentioned means including a direct current voltage source, a voltage dividing rheostat operable by said second servomechanism, a capacitor and a solenoid stabilizing coil.

11. A control system for a prime mover and generator power plant comprising a device for admitting working fuel to the prime mover and arranged to be operated by a governor output shaft operable from positioning of an accelerator lever, said shaft being also operable from positioning of a servomechanism arranged to be responsive after a time delay to movement of said accelerator lever in a direction such as to reduce the rate of fuel admission, and said shaft being also operable from positioning of a servomechanism arranged to be responsive to an electrical quantity determined by actual speed of the prime mover with respect to the setting of a speed governing rheostat actuated by said first mentioned servomechanism.

12. In a gas electric vehicle having a foot-operated accelerator pedal, a gas engine, a throttle valve associated with the fuel intake of said gas engine, an electric generator adapted to be driven by said engine, said generator having a field winding adapted to be energized by a D.-C. source of electric current, speed responsive means adapted to be driven by said engine to energize an electric circuit, a governor device having an input shaft and an output shaft, means for connecting said accelerator pedal to said input shaft, means including a spring loading of said output shaft and a linkage for allowing said output shaft to follow initial movement of said input shaft to open said throttle valve, fuel limiting means adapted to be actuated by said linkages after a predetermined time delay, a speed control rheostat adapted to be actuated by said fuel limiting means and connected in said electric circuit energized by said speed responsive means, speed governing means arranged to vary said spring loading of said governor output shaft, means including a solenoid operated valve in said electric circuit energized by said speed responsive means for actuating said speed governing means, and a load control rheostat adapted to be operated by said speed governing means and connected in the circuit of said generator field winding for controlling the load of said engine generator.

13. In a gas electric vehicle having a foot-operated accelerator pedal, a gas engine, a throttle valve associated with the fuel intake of said gas engine, an electric generator adapted to be driven by said engine, said generator having a field winding adapted to be energized by a D.-C. source of electric current, speed responsive means adapted to be driven by said engine to energize an electric circuit, a governor device having an input shaft and an output shaft, means for connecting said accelerator pedal to said input shaft, means connecting said input shaft to a rheostat connected in the circuit of said generator field winding for allowing low speed operation of said vehicle, means including a spring loading of said output shaft and a linkage for allowing said output shaft to follow initial movement of said input shaft to open said throttle valve, means including a fuel limit and speed setting servomechanism operated by said input shaft for thereafter decreasing the opening of said throttle valve, means including a porous plug in an oil line supplying said servomechanism for providing a predetermined time delay in the operation of said servomechanism, means including a rheostat operated by said load control servomechanism and connected in circuit with said speed responsive means for speed setting action, means including a solenoid operated valve for controlling the action of said last-mentioned servomechanism, means for energizing said solenoid operated valve from said speed responsive means in circuit with said speed setting rheostat, means including a rheostat operated by said second mentioned servomechanism and connected in the circuit of said generator field winding for controlling the load of said engine generator responsive to action of said servomechanism, means including a stabilizing winding and a stabilizing voltage dividing rheostat in the circuit of said stabilizing winding for stabilizing the operation of said solenoid, and means including a linkage to change the setting of said output shaft and said throttle valve responsive to movement of said second mentioned servomechanism.

MARTIN ARTHUR EDWARDS.
CARL B. LEWIS.

REFERENCES CITED

The following references are of record in the file of this patent:

UNITED STATES PATENTS

| Number | Name | Date |
|---|---|---|
| 2,050,068 | Schaer | Aug. 4, 1936 |
| 2,152,025 | Brunner | Mar. 28, 1939 |
| 2,207,373 | Dilworth | July 9, 1940 |

Certificate of Correction

Patent No. 2,489,871 November 29, 1949

MARTIN ARTHUR EDWARDS ET AL.

It is hereby certified that error appears in the printed specification of the above numbered patent requiring correction as follows:

Column 6, line 19, after the word "said" insert *second*;

and that the said Letters Patent should be read with this correction therein that the same may conform to the record of the case in the Patent Office.

Signed and sealed this 16th day of May, A. D. 1950.

[SEAL]

THOMAS F. MURPHY,
*Assistant Commissioner of Patents.*